US008462087B2

(12) United States Patent
Lee et al.

(10) Patent No.: US 8,462,087 B2
(45) Date of Patent: Jun. 11, 2013

(54) ORGANIC LIGHT EMITTING DIODE DISPLAY

(75) Inventors: Hong Koo Lee, Incheon (KR); Sang Hoon Jung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1041 days.

(21) Appl. No.: 11/880,734

(22) Filed: Jul. 24, 2007

(65) Prior Publication Data

US 2008/0100609 A1 May 1, 2008

(30) Foreign Application Priority Data

Oct. 31, 2006 (KR) ........................ 10-2006-0106612

(51) Int. Cl.
*G06F 3/033* (2006.01)

(52) U.S. Cl.
USPC .................. 345/79; 345/76; 345/36; 345/39; 345/44; 345/209; 313/463; 315/169.3

(58) Field of Classification Search
USPC ... 345/36, 39, 44–46, 74.1–83, 209; 313/463; 315/169.3
See application file for complete search history.

(56) References Cited

U.S. PATENT DOCUMENTS

| | | | | |
|---|---|---|---|---|
| 2002/0005846 | A1* | 1/2002 | Hiroki et al. | 345/204 |
| 2004/0119932 | A1* | 6/2004 | Kim | 349/172 |
| 2005/0184937 | A1 | 8/2005 | Lee | |
| 2006/0092185 | A1* | 5/2006 | Jo et al. | 345/690 |

FOREIGN PATENT DOCUMENTS

| | | | |
|---|---|---|---|
| CN | 1334551 A | | 2/2002 |
| JP | 2006-119179 | | 5/2006 |
| TW | 200601215 | | 1/2006 |
| TW | I261793 B | | 9/2006 |
| WO | WO 2005034072 A1 | | 4/2005 |

OTHER PUBLICATIONS

Office Action issued in corresponding Chinese Patent Application No. 200710139746.0; issued May 8, 2009.

Office Action issued in corresponding Japanese Patent Application No. 2007-168756; mailed Jun. 23,2010.

Office Action issued in corresponding Taiwan Patent Application No. 096127665, mailed Feb. 15, 2012.

Office Action issued in corresponding Japanese Patent Application No. 2007168-756, mailed Dec. 13, 2010.

* cited by examiner

*Primary Examiner* — Kevin M Nguyen
*Assistant Examiner* — Cory Almeida
(74) *Attorney, Agent, or Firm* — Brinks Hofer Gilson & Lione

(57) ABSTRACT

An organic light emitting diode display device and the driving method thereof that is adaptive for increasing display quality. The organic light emitting diode display device according to an embodiment includes a display panel where pixels having an organic light emitting diode device are arranged in a matrix type and a data driver that supplies a data voltage and an inverted voltage to the pixels, where the inverted voltage is symmetric to the data voltage relative to a reference voltage.

11 Claims, 25 Drawing Sheets

ORGANIC LIGHT EMITTING DIODE DISPLAY

This application claims the benefit of the Korean Patent Application No. P2006-0106612 filed on Oct. 31, 2006, which is hereby incorporated by reference.

TECHNICAL FIELD

The present invention relates to an organic light emitting diode display device, and more particularly to an organic light emitting diode display device and the driving method thereof that is adaptive for increasing display quality.

BACKGROUND

Description of the Related Art

Recently, there has been developed various flat panel display devices that can reduce their weight and size which were disadvantages of a cathode ray tube. The flat panel display device includes a liquid crystal display (hereinafter, referred to as "LCD") device, a field emission display FED device, a plasma display panel (hereinafter, referred to as "PDP"), an electroluminescence EL device and the like.

The PDP among them is simple in its structure and fabrication process, thus the PDP is light, thin, short and small and has been paid attention to as a display device which is most advantageous in being made large-sized, but there is a big disadvantage in that the luminous efficiency and brightness thereof is low and the power consumption thereof is high. An active matrix LCD to which a thin film transistor (hereinafter, referred to as "TFT") is applied as a switching device is difficult to be made large-sized because a semiconductor process is used. But, the demand for the LCD is continuously increasing since the LCD is mainly used as a display device of a notebook computer. In comparison with this, the electroluminescence device is broadly classified into an inorganic electroluminescence device and organic electroluminescence device in accordance with a material of a luminous layer thereof. The electroluminescence device is a self-luminous device which emits light on its own, and has an advantage in that its response speed is fast and its luminous efficiency, brightness and viewing angle are high.

An organic light emitting diode device includes an organic compound layer HIL, HTL, EML, ETL, EIL formed between an anode electrode and a cathode electrode, as in FIG. 1.

The organic compound layer includes a hole injection layer HIL, a hole transport layer HTL, an emission layer EML, an electron transport layer ETL and an electron injection layer EIL.

If drive voltages are applied to the anode electrode and the cathode electrode, holes within the hole injection layer HTL and electrons within the electron injection layer respectively move to the emission layer EML to excite the emission layer EML. And, as a result thereof, the emission layer EML emits a visible ray. In this way, a picture or image is displayed with the visible ray generated from the emission layer EML.

The organic light emitting diode device is classified into a passive matrix type display device and an active matrix type display device using a TFT as a switching device. The passive matrix type selects light emission cells in accordance with currents applied to the anode electrodes and the cathode electrodes which perpendicularly cross each other. On the contrary, the active matrix type selectively turns on the TFT being an active device to select the light emission cell, and maintains the luminescence of the light emission cell with the voltage kept in a storage capacitor.

FIG. 2 is a circuit diagram equivalently representing one pixel in an active matrix type organic light emitting diode display device.

Referring to FIG. 2, the pixel of the active matrix type organic light emitting diode display device includes an organic light emitting diode OLED; a data line DL and a gate line GL which cross each other; a switch TFT T1; a drive TFT T2; and a storage capacitor Cst. The switch TFT T1 and the drive TFT T2 are realized in a p-type MOS-FET.

The switch TFT T1 is turned on in response to a gate low voltage (or scan voltage) from the gate line GL to form a current path between its own source electrode and drain electrode, and maintains an off-state when a voltage of the gate line GL is the gate high voltage which is higher than its own threshold voltage Vth. During the on-time interval of the switch TFT T1, the data voltage from the data line DL is applied to the storage capacitor Cst and the gate electrode of the drive TFT T2 through the source electrode and the drain electrode of the switch TFT T1. On the contrary, during the off-time interval of the switch TFT T1, the current path between the source electrode and the drain electrode of the switch TFT T1 is opened so that no data voltage is applied to the drive TFT T2 and the storage capacitor Cst.

The source electrode of the drive TFT T2 is connected to one side electrode of the storage capacitor Cst and a high level power supply voltage source VDD and the drain electrode thereof is connected to the anode electrode of the organic light emitting diode OLED. And, the gate electrode of the drive TFT T2 is connected to the drain electrode of the switch TFT T1. The drive TFT T2 controls the current between the source electrode and the drain electrode in accordance with the gate voltage, i.e., data voltage, supplied to the gate electrode, thereby making the organic light emitting diode OLED emit light at a brightness corresponding to the data voltage.

The storage capacitor Cst stores a difference voltage between the data voltage and the high level power supply voltage VDD to fixedly maintain the voltage applied to the gate electrode of the drive TFT T2 for one frame period.

The organic light emitting diode OLED is realized in a structure, as in FIG. 1, and includes an anode electrode connected to the drain electrode of the drive TFT, T2 and a cathode electrode connected to a low level drive voltage source VSS.

The brightness of the pixel, as in FIG. 2, is proportional to the current flowing in the organic light emitting diode OLED and the current is controlled by the gate voltage of the drive TFT T2. That is to say, in order to increase the brightness of the pixel, a gate-source voltage |Vgs| of the drive TFT T2 should be made high. On the contrary, in order to make the brightness of the pixel lower, the gate-source voltage |Vgs| of the drive TFT T2 should be made low.

The active matrix type organic light emitting diode display device, as in FIG. 2, has a problem in that image sticking might be easily generated though its aperture ratio is relatively better than that of the organic light emitting diode display device where three or more TFTs are formed for each pixel. FIG. 3 shows an example of a residual image appearing when applying the test data of an intermediate gray level to pixels of the previous screen after applying the data of a residual image test image (left image), which is made by combining a white gray level and a black gray level into a chess board image, to the organic light emitting diode display device for about 9 seconds. The residual image of the organic light emitting diode display device is classified into a recoverable residual image which disappears when time elapses, and an image burning which is left there forever. The recoverable residual image is mainly shown because of the TFT characteristic deterioration of pixels, and the image burning is mainly shown because of the deterioration of organic compound layers HIL, HTL, EML, ETL, EIL.

FIGS. 4 and 5 represent an experiment reproducing a residual image effect of a chess board image which appears in an organic light emitting diode display device of the related art, as in FIG. 2. FIG. 6 shows a cross sectional of a drive TFT T2.

Referring to FIGS. 4 to 6, a drain-source current Ids of the drive TFT T2 is measured when the voltage (gate voltage) of the gate electrode is changed to −5V being the intermediate gray level voltage after applying 0V being a black gray level voltage or −7V being a white gray level voltage to the gate electrode of the drive TFT T2 for 16.7 msec. In this experiment, 0V is applied to the source electrode of the drive TFT T2 and −7V is applied to the drain electrode.

In FIG. 5, a solid line represents a change of the drain-source current Ids of the drive TFT T2 when the gate voltage of the drive TFT T2 is changed from the black gray level voltage to the intermediate gray level voltage. And, a dotted line represents a change of the drain-source current Ids of the drive TFT T2 when the gate voltage of the drive TFT T2 is changed from the white gray level voltage to the intermediate gray level voltage. The dashed-dotted line represents the change of the drain-source current Ids of the drive TFT T2 when maintaining the gate voltage of the drive TFT T2 at the intermediate gray level voltage, i.e., −5V.

When the gate voltage of the drive TFT T2 is the black gray level voltage or the white gray level voltage like the solid line or the dotted line, slow state charges of an insulating layer 61 of FIG. 6 are trapped or de-trapped, and if the gate voltage of the drive TFT T2 is changed to the intermediate gray level voltage, the charges of the insulating layer 61 are changed to a state of equilibrium of the intermediate gray level. There is an error of the drain-source current of the drive TFT T2 till the charges reach from the slow state to the state of equilibrium, and the error is about 20 nA at maximum as in an arrow mark of FIG. 5 and is reduced as time elapses.

To describe this specifically, if the gate voltage of the drive TFT T2 is changed from the black gray level to the intermediate gray level, the charge amount Qgate of the gate electrode is instantly increased, and the charge amount Qsemiconductor of a semiconductor layer 62 is also increased. Although the charge amount Qinsulator of the insulating layer 61 is not increased rapidly, but the charge amount Qinsulator of the insulating layer 61 is increased as time elapses. And, the charge of the drive TFT T2 satisfies an expression of Qgate+Qinsulator+Qsemiconductor=0 (the polarity of Qgate is opposite to the polarity of Qinsulator and Qsemiconductor) according to the charge amount conservation law, thus the charge amount of the semiconductor layer 62 is reduced to decrease the drain-source current Ids. In case of the gate voltage of the drive TFT T2 is changed from the white gray level voltage to the intermediate gray level, the charge amount Qsemiconductor of the semiconductor layer 62 is reduced as much as the charge amount Qgate of the gate voltage reduced by the white gray level voltage to decrease the drain-source current Ids, and the charge amount Qinsulator of the insulating layer 61 affected by the electric field between the gate electrode and the semiconductor layer 62 is reduced to increase the drain-source current Ids. In these two cases, the charges are changed to the state of equilibrium as time elapses, thus the drain-source currents Ids become the same.

In the end, the residual image is a result that the difference between the drain-source currents Ids appears as the brightness of the organic light emitting diode display device when the gate voltage of the drive TFT T2 is changed from the white gray level voltage to the intermediate gray voltage or from the black gray level voltage to the intermediate gray voltage. If the difference between the drain-source currents Ids of the drive TFT T2 which appears when the gate voltage of the drive TFT T2 is changed is reduced, then the residual image can be reduced.

Further, there is a problem in that if the voltage of the same polarity or the DC voltage is continuously applied to the gate electrode of the drive TFT T2, the characteristic of the drive TFT T2 is deteriorated, i.e., a gate bias stress of the drive TFT T2 is increased to change the threshold voltage of the drive TFT T2.

SUMMARY

In one embodiment, an organic light emitting diode display device includes a display panel where pixels having an organic light emitting diode device are arranged in a matrix and a data driver that supplies a data voltage to the pixels, and supplies an inverted voltage to the pixels, wherein the inverted voltage is symmetric to the data voltage relative to a reference voltage.

In another embodiment a driving method of an organic light emitting diode display device where pixels including an organic light emitting diode device are arranged in a matrix includes providing a drive device configured to drive the organic light emitting diode in accordance with a gate voltage applied to a gate electrode and supplying a data voltage and an inverted voltage to the gate electrode of the drive device, wherein the inverted voltage is symmetric to the data voltage on the basis of a reference voltage.

BRIEF DESCRIPTION OF THE DRAWINGS

These and other objects of the invention will be apparent from the following detailed description of the embodiments of the present invention with reference to the accompanying drawings, in which.

DETAILED DESCRIPTION

Reference will now be made in detail to the preferred embodiments of the present invention, examples of which are illustrated in the accompanying drawings.

With reference to FIGS. 7 to 20, embodiments of the present invention will be explained as follows.

Figure 7:
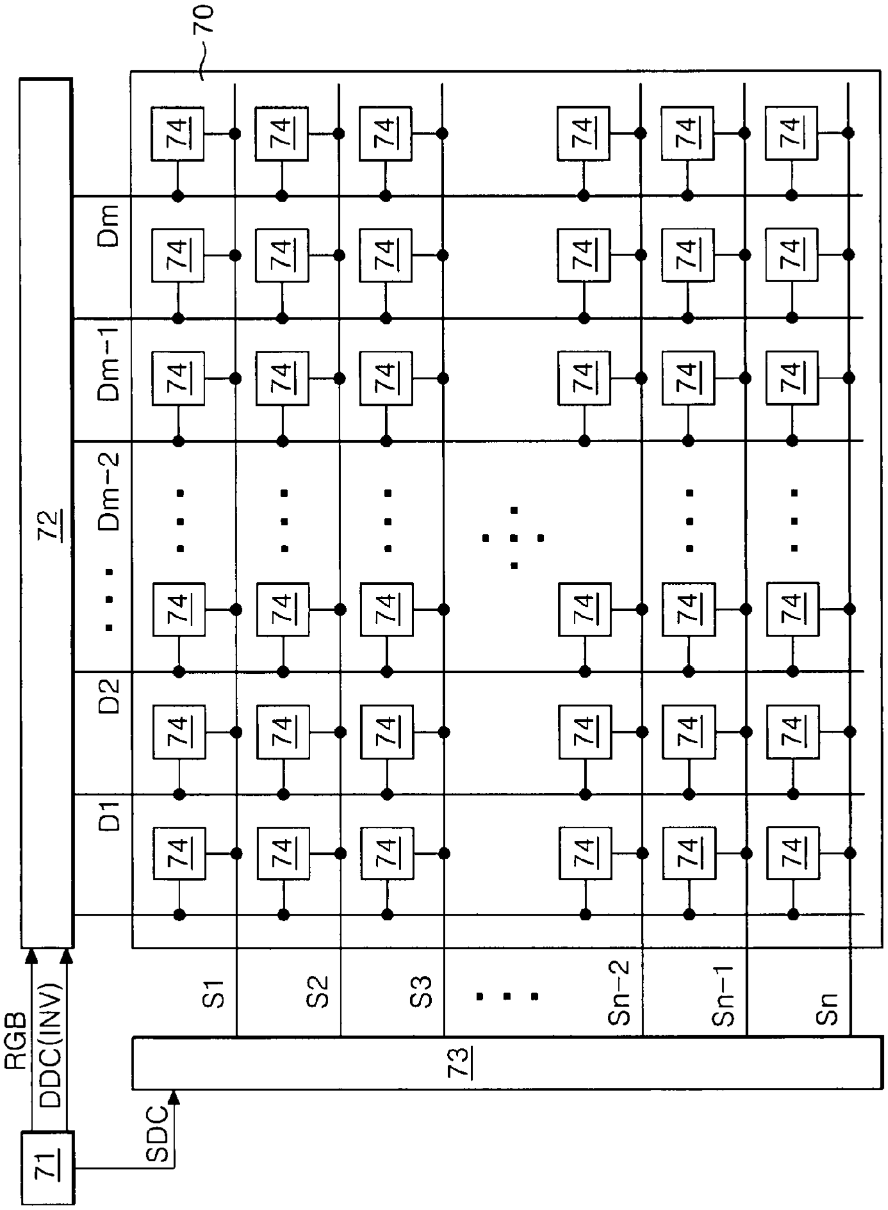
FIG. 7 is a block diagram illustrating an organic light emitting diode display device according to an embodiment of the present invention.

Referring to FIG. 7, an organic light emitting diode display device according to an embodiment of the present invention includes a display panel 70 where m×n number of pixels 74 are formed; a data driver 72 for supplying data voltages to m number of data lines D1 to Dm; a scan driver 73 for sequentially supplying scan pulses to n number of scan lines S1 to Sn; and a timing controller 71 for controlling the drivers 72, 73.

In the display panel 70, pixels 74 are formed in pixel areas defined by the crossing of the scan lines S1 to Sn, E1 to En of the data lines D1 to Dm. In each pixel 74 of the display panel 70 are supplied high level power supply voltage VDD and low level power supply voltage VSS.

The data driver 72 converts digital video data RGB from the timing controller 71 into analog gamma compensation voltages. And, a first embodiment of the data driver 72 supplies inverted data voltages to the data lines D1 to Dm for a ½ frame period in response to control signals DDC(INV) from the timing controller 71, and then supplies non-inverted data voltages to the data lines D1 to Dm for the remaining ½ frame period. Differently from this, a second embodiment of the data driver 72 supplies the non-inverted data voltages to the data lines D1 to Dm for a ½ frame period in response to control signals DDC(POL) from the timing controller 71, and then supplies the inverted data voltages to the data lines D1 to Dm for the remaining ½ frame period.

Furthermore, a third embodiment of the data driver 72 supplies a non-inverted data voltage to any one pixel 74 of two pixels 74, which are adjacent to each other in a vertical and horizontal directions, and supplies an inverted data voltage to the other pixel 74 in response to a control signal (DDC (POL2)) from the timing controller 71. Herein, the non-inverted data voltage and the inverted data voltage, which are supplied to the adjacent pixels 74, are inversed by a ½ frame period unit.

The scan driver 73 sequentially supplies scan pulses to the scan lines S1 to Sn for a ½ frame period in response to control signals SDC from the timing controller 71, and then sequentially supplies the scan pulses to the scan lines S1 to Sn for the remaining ½ frame period. That is to say, the scan driver 73 supplies the scan pulses to each of the scan lines S1 to Sn two times. Herein, the scan driver 73 and the data driver are driven with a frequency having a double speed (for example, 120 Hz) compared to the related art.

The timing controller 71 supplies the digital video data RGB to the data driver 72, and generates the control signals DDC(POL), SDC for controlling the operation timing of the data driver 72 and the scan driver 73 using vertical/horizontal synchronous signals and clock signal and the like. Furthermore, the present invention includes a frame memory that stores and delays the digital video data RGB corresponding to one frame for one frame period. The frame memory stores and delays the digital video data RGB corresponding to a (n+1)th frame during the digital video data corresponding to a nth frame is supplied to the data driver 72, and then supplies them to the timing controller 71. Herein, such a frame memory may be mounted in the timing controller 71.

Figure 8:
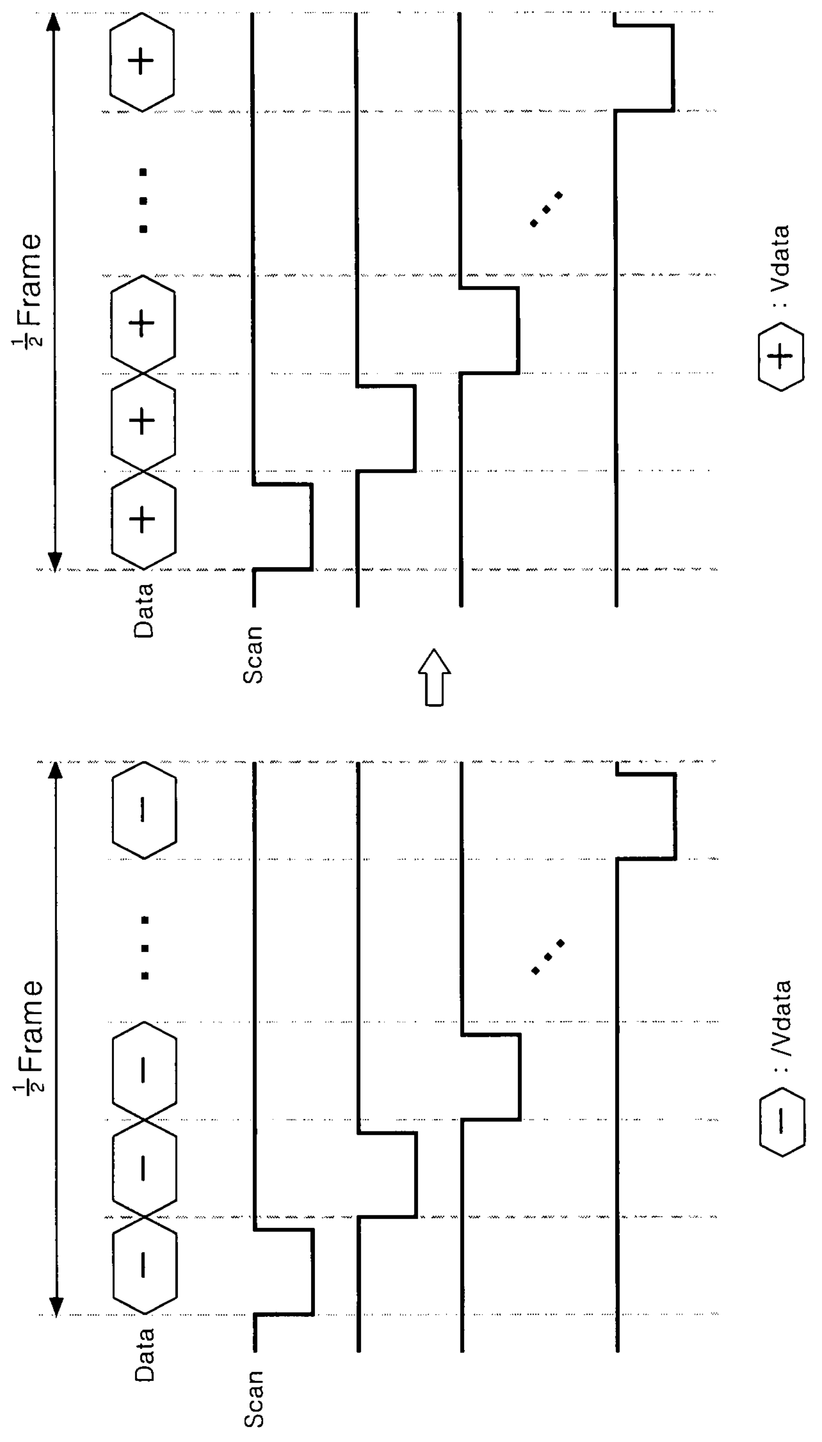
FIG. 8 is a waveform diagram illustrating a first embodiment of a drive waveform according to the present invention.

FIG. 8 represents a first embodiment of a drive waveform outputted from the data driver 72 and a scan pulse outputted from the scan driver 73.

Referring to FIG. 8, the data driver 72 supplies the black gray level voltages /Vdata, which are inverted, to the data lines D1 to Dm for the first half frame period of one frame period, and then supplies real data voltages Vdata, which are to be displayed, to the data lines D1 to Dm for the second half frame period.

The black gray level voltage /Vdata is a voltage which is symmetric to the real data voltage Vdata on the basis of a reference voltage corresponding to the lowest gray level. Accordingly, a voltage difference between the black gray level voltage /Vdata and the reference voltage is the same as a voltage difference between the real data voltage Vdata and the reference voltage.

The scan driver 73 sequentially supplies the scan pulses to each of the scan lines S1 to Sn two times so as to be synchronized with each of the black gray level voltage /Vdata and the real data voltage Vdata to be displayed.

Figure 9:
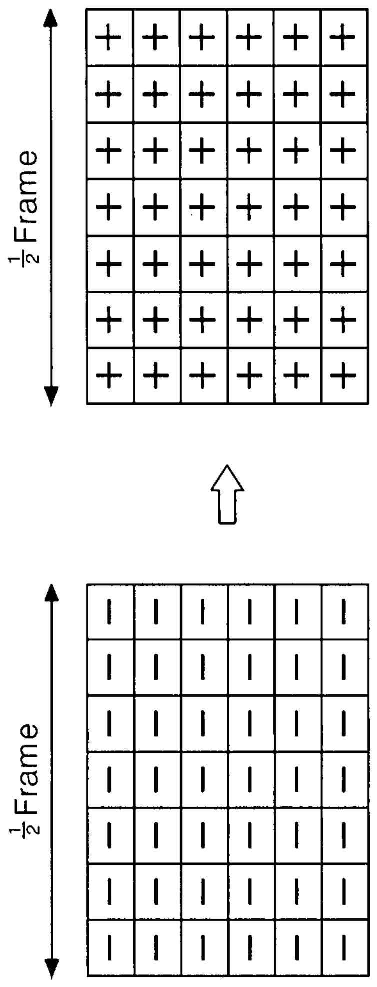
FIG. 9 is a diagram illustrating polarity patterns of the black gray level voltage and the real data voltage, which are supplied to pixels, as the drive waveform in FIG. 8 is applied to a display panel.

Accordingly, an image is realized by the black gray level voltage /Vdata for the first half frame period of one frame period, and an image is realized by the real data voltage Vdata for the second half frame period of one frame period as shown in FIG. 9. For example, a black image is realized by the black gray level voltage /Vdata for the first half frame period of one frame period, and a normal image, which is required by the user, is realized by the real data voltage Vdata.

Figure 10:
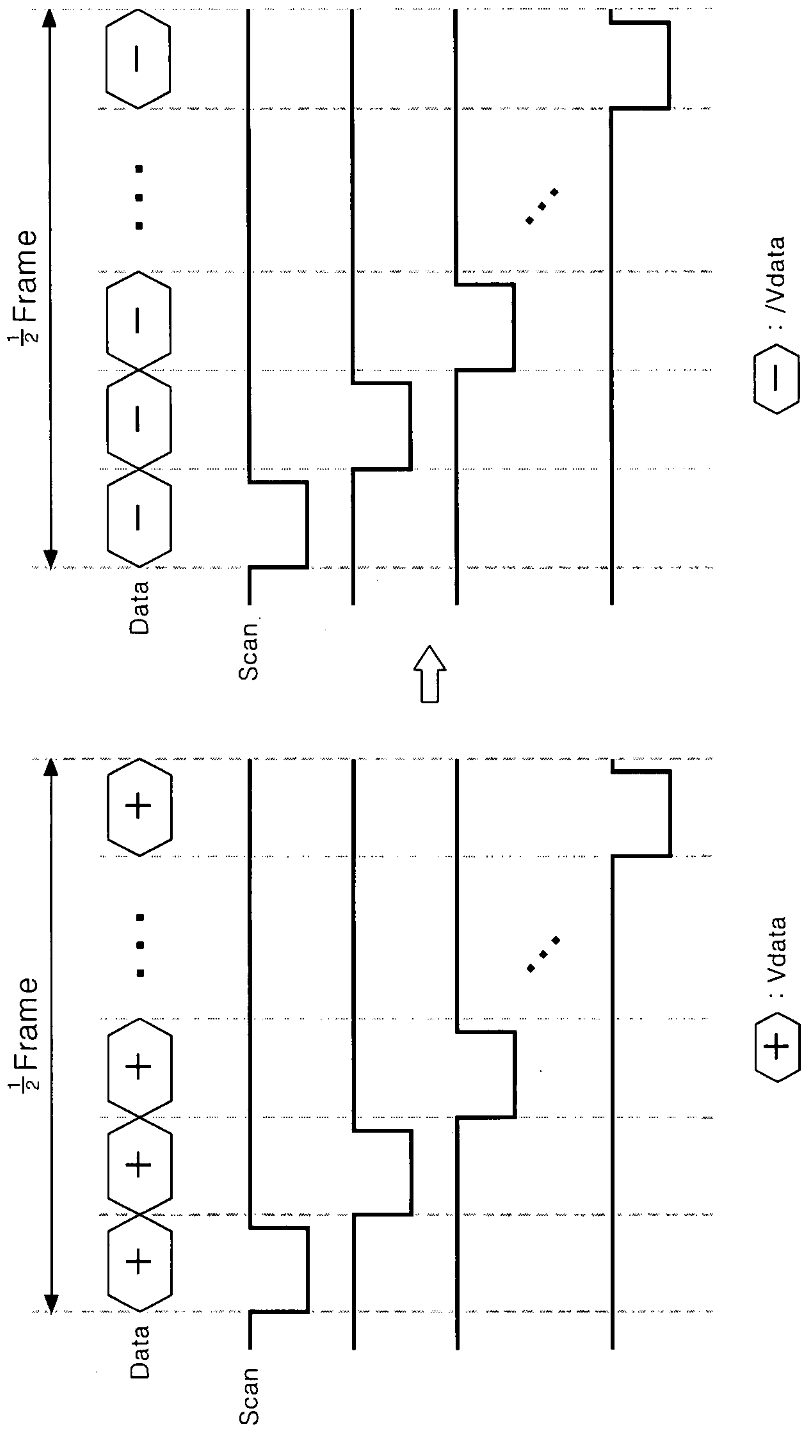
FIG. 10 is a waveform diagram illustrating a second embodiment of a drive waveform according to the present invention.

FIG. 10 represents a second embodiment of a drive waveform outputted from the data driver 72 and a scan pulse outputted from the scan driver 73.

Referring to FIG. 10, the data driver 72 supplies the real data voltages Vdata to the data lines D1 to Dm for the first half frame period of one frame period, and then supplies the black gray level voltages /Vdata to the data lines D1 to Dm for the second half frame period.

In this embodiment as well, the black gray level voltage /Vdata is a voltage which is symmetric to the data voltage Vdata to be displayed on the basis of a reference voltage corresponding to the lowest gray level.

The scan pulses are supplied to each of the scan lines S1 to Sn two times so as to be synchronized with each of the black gray level voltage /Vdata and the real data voltage Vdata to be displayed.

Figure 11:
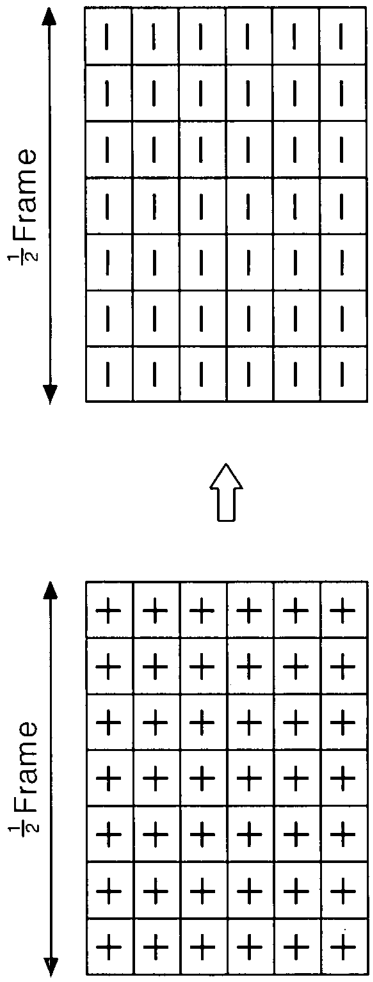
FIG. 11 is a diagram illustrating polarity patterns of the black gray level voltage and the real data voltage, which are supplied to pixels, as the drive waveform in FIG. 10 is applied to a display panel.

Accordingly, an image is realized by the real data voltage Vdata for the first half frame period of one frame period, and an image is realized by the black gray level voltage /Vdata for the second half frame period of one frame period as shown in FIG. 11.

In the first and second embodiments of the present invention, the real data voltage Vdata or the black gray level voltage /Vdata is uniformly supplied to all pixels for a frame period.

Accordingly, data voltages, which have the same level and a different polarity, are alternately supplied to each pixel 74 for one frame period.

Figure 12:
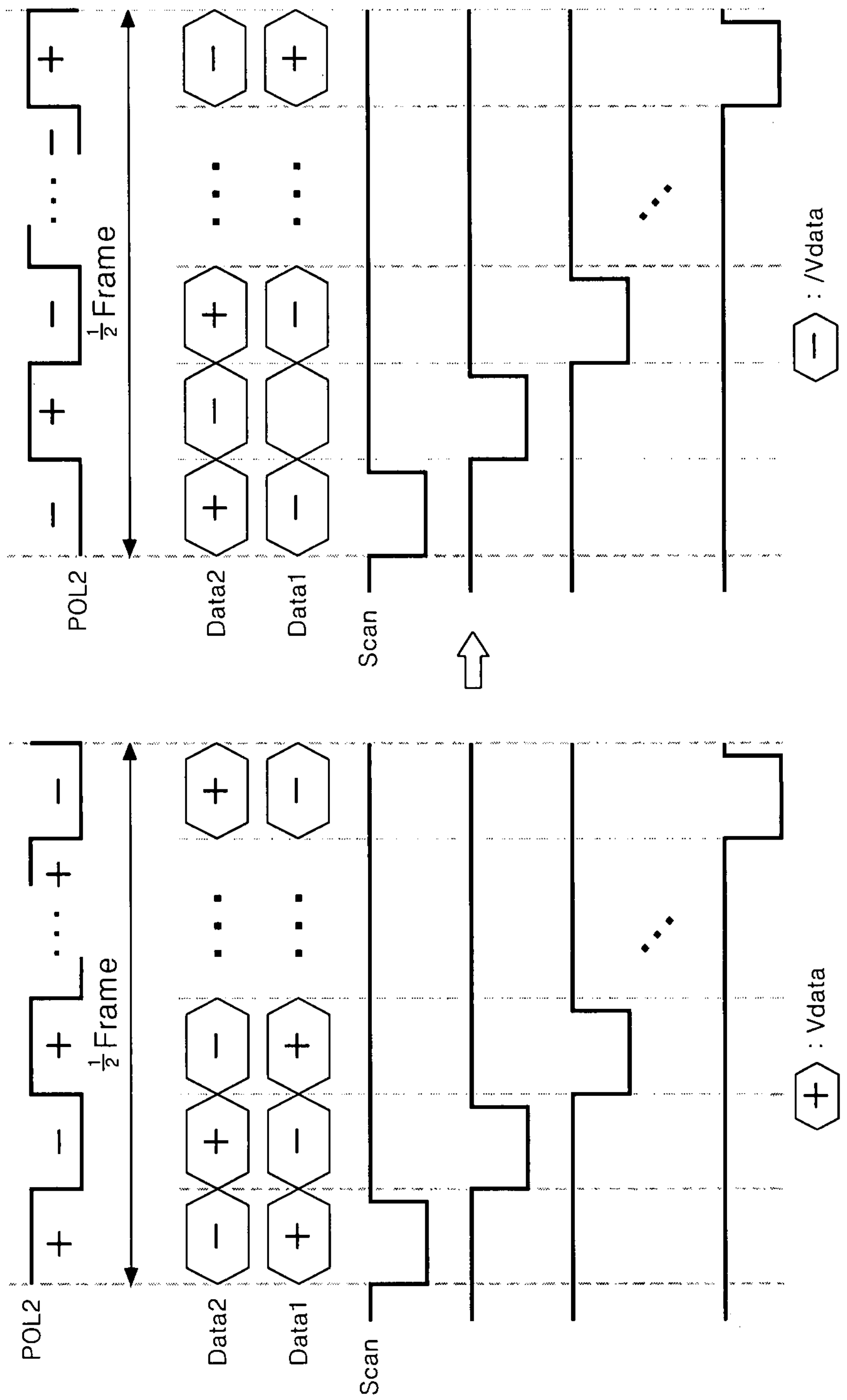
FIG. 12 is a waveform diagram illustrating a third embodiment of a drive waveform according to the present invention.
Figure 13:
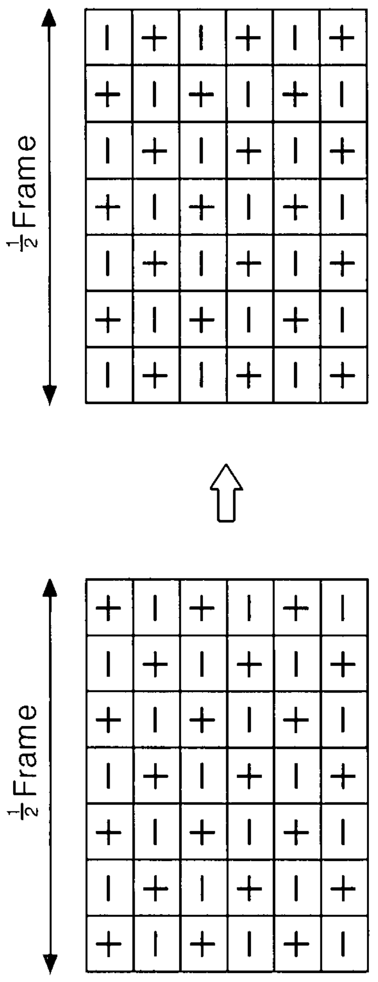
FIG. 13 is a diagram illustrating polarity patterns of the black gray level voltage and the real data voltage, which are supplied to pixels, as the drive waveform in FIG. 12 is applied to a display panel.

FIG. 12 shows a third embodiment of a scanning pulse, which is outputted from the scan driver 73, and a drive waveform, which is outputted from the data driver 72.

In the third embodiment of the present invention, the real data voltage Vdata and the black gray level voltage /Vdata are simultaneously supplied to the data lines D1 to Dm by a dot inversion method.

A dot inversion method supplies a data signal, which has an inversed polarity compared to a data signal which is supplied to the pixels 74 which are adjacent from a vertical/horizontal directions, to each of the pixels 74 on the display panel 70, and inverses polarities of data signals with which all pixels 74 on the display panel 70 are supplied for each frame.

More specifically, the data driver 72 supplies the real data voltage Vdata to any one pixel 74 of two pixel 74, which are adjacent in a vertical and horizontal directions, and supplies the black gray level voltage /Vdata to the other pixel 74 for the first half frame period of one frame period.

Furthermore, the data driver 72 supplies the black gray level voltage /Vdata to pixels 74, which are supplied with the real data voltage Vdata for the first half frame period, and supplies the real data voltage Vdata to the pixels 74, which are supplied with the black gray level voltage /Vdata for the first half frame period, for the second half frame period of one frame period.

In the third embodiment of the present invention, the black gray level voltage /Vdata is a voltage, which is symmetric to the real data voltage Vdata on the basis of the reference voltage corresponding to a minimum gray level. Accordingly, a voltage difference between the black gray level voltage /Vdata and the reference voltage is the same as a voltage difference between the real data voltage Vdata and the reference voltage.

The scan driver 73 sequentially supplies the scan pulses to each of the scan lines S1 to Sn two times so as to be synchronized with a data voltage, which is supplied for the first half ½ frame period, and a data voltage, which is supplied for the second half ½ frame period.

Accordingly, an image is realized by the real data voltage Vdata for the first half frame period and the second half frame period of one frame period.

In this way, the third embodiment of the present invention alternately supplies data voltages, which have the same level and a different polarity, to each pixel 74 for one frame period similar to the first and second embodiments.

Furthermore, the third embodiment of the present invention realizes an image using the real data voltage Vdata for one frame period to realize an image having credibility compared to the first and second embodiments that realize an image using the real data voltage Vdata for only frame period of one frame period The organic light emitting diode display device according to the first and third embodiments of the present invention periodically applies the black gray level voltage /Vdata, which is symmetric to the real data voltage Vdata on the basis of the reference voltage, to the gate electrode of the drive TFT included in each pixel, thereby making DC biases not to be applied to the gate electrode of the drive TFT continuously. The charges trapped in an interface between the gate electrode and an insulating layer and an interface between the insulating layer and a semiconductor layer are periodically de-trapped under the control of the gate voltage of the drive TFT to prevent an adverse effect for the electrical characteristic of the drive TFT caused by the charges trapped in the interface, which are a cause of residual images. To describe this in detail, the charges of the drive TFT satisfy the expression of Qgate+Qinsulator+Qsemiconductor=0, thus if Δ Qinsulator is minimized, the drain-source current Ids of the drive TFT related to Qsemiconductor is affected only by the gate voltage related to Qgate. Accordingly, the organic light emitting diode display device according to the embodiment of the present invention prevents the residual image by minimizing the effect of the charges accumulated in the insulating layer of the drive TFT. Further, the organic light emitting diode display device according to the embodiment of the present invention alternately applies opposite polarity voltages of the same size to the gate electrode of the drive TFT for one frame period, thus even though the charges are accumulated in the insulating layer, the charges are offset with the electric fields of the polarities opposite to each other for one frame period.

Figure 14:
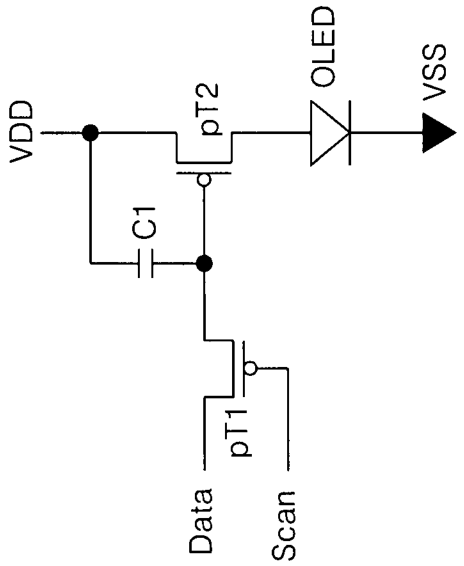
FIG. 14 is a diagram illustrating a first embodiment of the pixel illustrated in FIG. 7.

FIG. 14 represents a first embodiment of the pixel 74.

Figure 1:
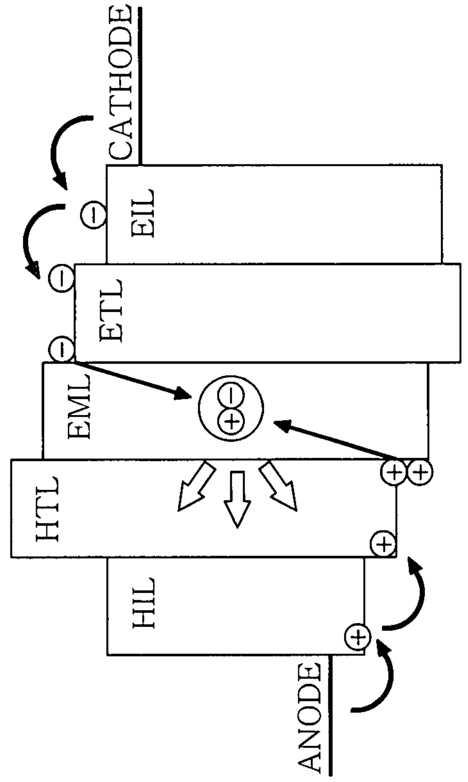
FIG. 1 RELATED ART
FIG. 1 is a schematic diagram showing a structure of an organic light emitting diode of the related art.
Figure 2:
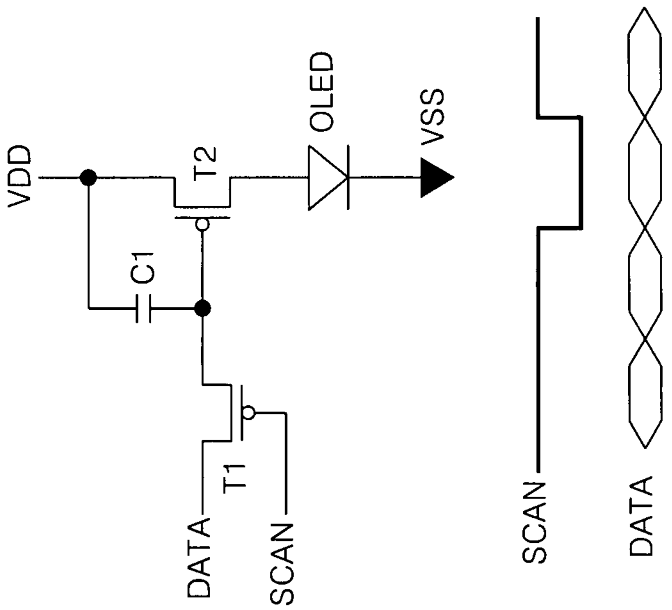
FIG. 2 RELATED ART
FIG. 2 is a circuit diagram showing a pixel in an active matrix type organic light emitting diode display device of the related art.
Figure 3:
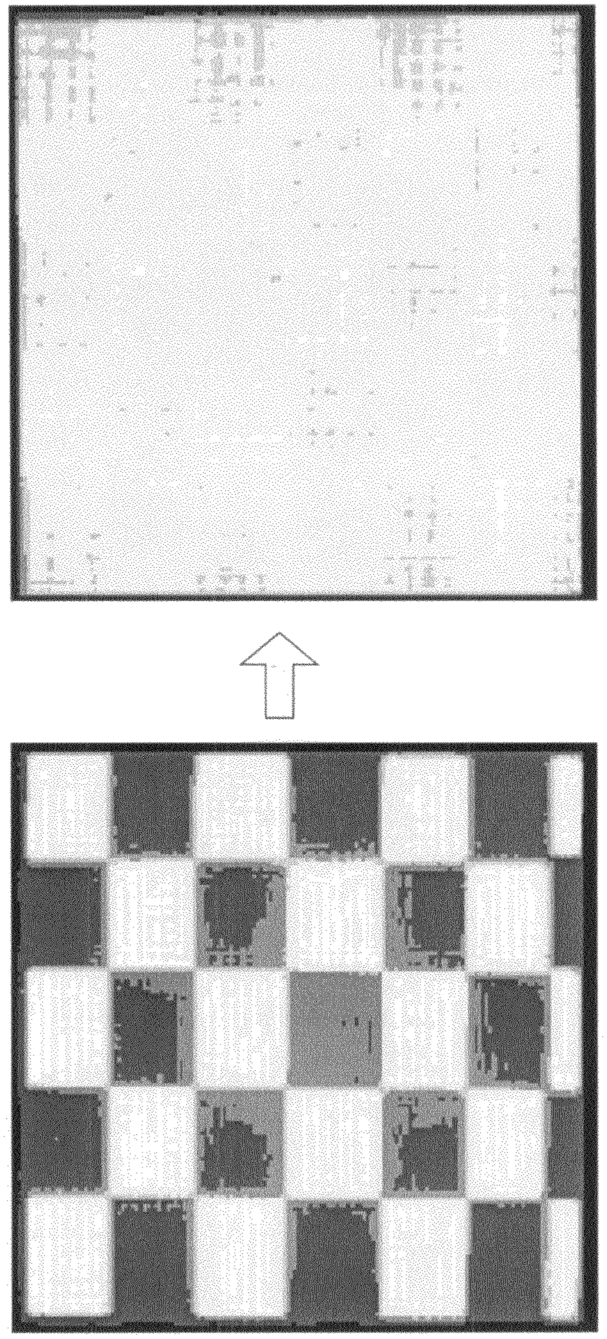
FIG.3 RELATED ART
FIG. 3 is a diagram showing a residual image according to the related art.
Figure 4:
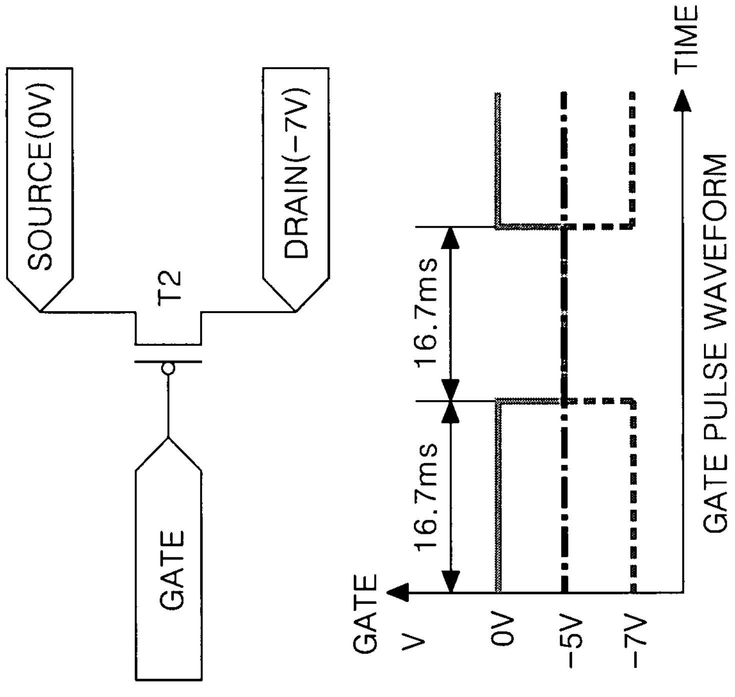
FIG. 4 RELATED ART
FIG. 4 is a diagram and a plot showing a gate voltage of a drive TFT in an experiment for reproducing the residual image, as in FIG. 3.

Referring to FIG. 14, the first embodiment of the pixel 74 includes a switch TFT pT1 and a drive TFT pT2 each realized in a p-type MOS-FET; a storage capacitor C1 for maintaining the gate voltage of the drive TFT pT2; and an organic light emitting diode OLED driven by the drive TFT pT2. The pixel 74 is substantially the same as the pixel of FIG. 2 in an aspect of configuration, but the pixel 74 is conspicuously different from the pixel of FIG. 2 by the drive waveform of FIG. 8, FIG. 10, and FIG. 12 in an aspect of operation and action effect.

The scan signal is generated to be a low logic voltage which is not higher than the threshold voltage of the switch TFT pT1.

The data voltage for making the organic light emitting diode OLED emit light by generating the drain-source current in the drive TFT pT2 is generated to be a voltage which is not higher than the reference voltage.

Figure 15:
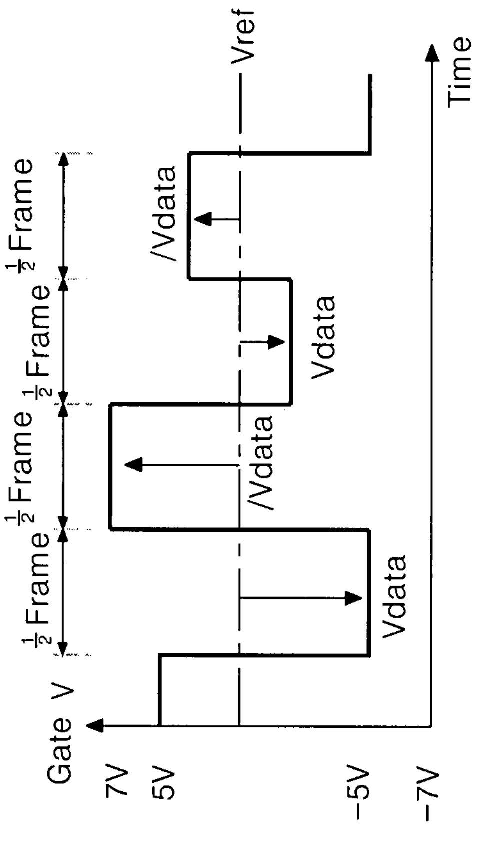
FIG. 15 is a waveform diagram illustrating a first embodiment of a drive waveform applied to the pixel, as in FIG. 14.

FIG. 15 represents a first embodiment of a drive waveform applied to the pixel 74, as in FIG. 14.

Referring to FIG. 15, the data driver 72 supplies the black gray level voltages /Vdata to the data lines D1 to Dm for the ½ frame period, and then supplies the real data voltages Vdata, which are to be displayed, to the data lines D1 to Dm for the second half frame period. The black gray level voltages /Vdata and the real data voltages Vdata supplied to the data lines D1 to Dm are supplied to the gate electrode of the drive TFT pT2 when the switch TFT pT1 is turned on by the scan pulses. The drive TFT pT2 maintains the off-state when the black gray level voltages /Vdata are applied to the gate electrode, and forms the drain-source channel when the real data voltages Vdata are applied to the gate electrode, thereby supplying the currents to the organic light emitting diode OLED so that the organic light emitting diode OLED is made to emit light at the brightness corresponding to the gray level of the data.

The black gray level voltage /Vdata of a positive voltage which is higher than the reference voltage Vref and the real data voltage Vdata of a negative voltage which is lower than the reference voltage Vref have a voltage difference which is symmetric on the basis of the reference voltage Vref. That is to say, the voltage difference between the black gray level voltage /Vdata and the real data voltage Vdata is substantially the same as the voltage difference between the real data voltage Vdata and the reference voltage Vref.

The storage capacitor C1 stores the real data voltage Vdata for the second half frame period to fixedly maintain the voltage of the drive TFT pT2.

The reference voltage Vref is a voltage corresponding to the lowest gray level, and is the same as the high level power supply voltage VDD.

Figure 16:
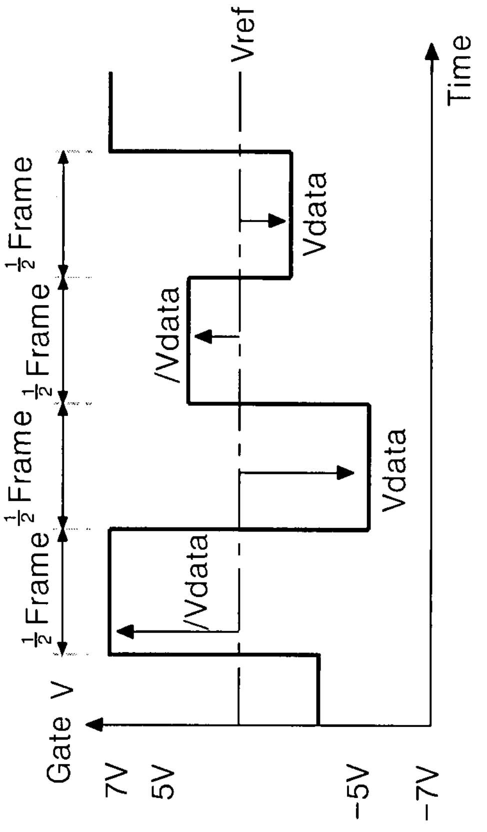
FIG. 16 is a waveform diagram illustrating a second embodiment of a drive waveform applied to the pixel, as in FIG. 14.

FIG. 16 represents a second embodiment of a drive waveform applied to the pixel 74, as in FIG. 14.

Referring to FIG. 16, the data driver 72 supplies the real data voltages Vdata to the data lines D1 to Dm for the ½ frame period, and then supplies the black gray level voltages /Vdata, which are to be displayed, to the data lines D1 to Dm for the second half frame period. The real data voltages Vdata and the black gray level voltages /Vdata supplied to the data lines D1 to Dm are supplied to the gate electrode of the drive TFT pT2 when the switch TFT pT1 is turned on by the scan pulses. The drive TFT pT2 forms the drain-source channel when the real data voltages Vdata are applied, thereby supplying the currents to the organic light emitting diode OLED so that the organic light emitting diode OLED is made to emit light at the brightness corresponding to the gray level of the data. And then, the drive TFT pT2 is turned off when the black gray level voltage /Vdata is applied.

The black gray level voltage /Vdata of a positive voltage and the real data voltage Vdata of a negative voltage have a voltage difference which is symmetric on the basis of the reference voltage Vref.

The storage capacitor C1 stores the real data voltage Vdata for the first half frame period to fixedly maintain the voltage of the drive TFT pT2.

Figure 17:
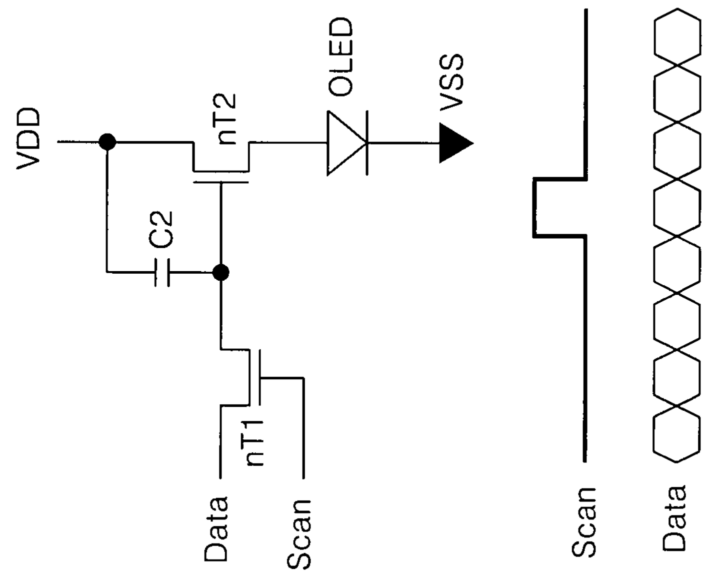
FIG. 17 is a diagram illustrating a second embodiment of the pixel shown in FIG. 7.

FIG. 17 represents a second embodiment of the pixel 74.

Referring to FIG. 17, the second embodiment of the pixel 74 includes a switch TFT nT1 and a drive TFT nT2 each realized in a n-type MOS-FET; a storage capacitor C2 for maintaining the gate voltage of the drive TFT nT2; and an organic light emitting diode OLED driven by the drive TFT nT2.

The scan signal for controlling the switch TFT nT1 of the pixel 74 is generated to be a high logic voltage which is not lower than the threshold voltage of the switch TFT nT1.

The data voltage for making the organic light emitting diode OLED emit light by generating the drain-source current in the drive TFT nT2 is generated to be a voltage which is not lower than the reference voltage.

Figure 18:
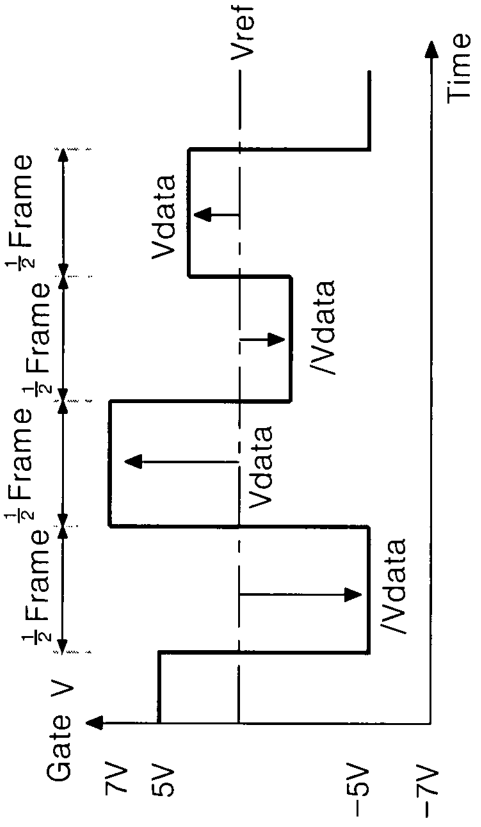
FIG. 18 is a waveform diagram illustrating a first embodiment of a drive waveform applied to the pixel, as in FIG. 17.

FIG. 18 represents a first embodiment of a drive waveform applied to the pixel 74, as in FIG. 17.

Referring to FIG. 18, the data driver 72 supplies the black gray level voltages /Vdata, which are negative voltages lower than the reference voltage Vref, to the data lines D1 to Dm for the ½ frame period, and then supplies the real data voltages Vdata, which are positive voltages higher than the reference voltage Vref, to the data lines D1 to Dm for the second half frame period. The black gray level voltages /Vdata and the real data voltages Vdata supplied to the data lines D1 to Dm are supplied to the gate electrode of the drive TFT nT2 when the switch TFT nT1 is turned on by the scan pulses. The drive TFT nT2 maintains the off-state when the black gray level voltages /Vdata are applied, and opens the drain-source channel when the real data voltages Vdata are applied, thereby supplying the currents to the organic light emitting diode OLED so that the organic light emitting diode OLED is made to emit light at the brightness corresponding to the gray level of the data.

The black gray level voltage /Vdata and the real data voltage Vdata have a voltage difference which is symmetric on the basis of the reference voltage Vref.

The storage capacitor C2 stores the real data voltage Vdata for the second half frame period to fixedly maintain the voltage of the drive TFT nT2.

The reference voltage Vref is a voltage corresponding to the lowest gray level, and is the same as the high level power supply voltage VDD.

Figure 19:
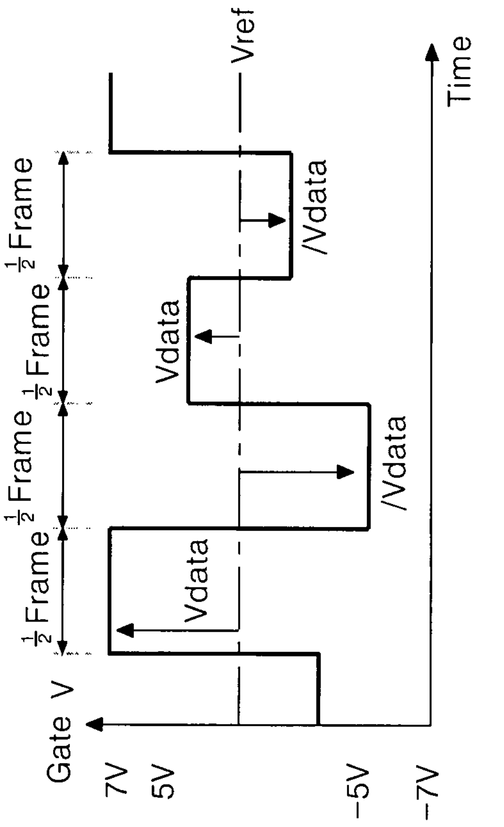
FIG. 19 is a waveform diagram illustrating a second embodiment of a drive waveform applied to the pixel, as in FIG. 17.

FIG. 19 represents a second embodiment of a drive waveform applied to the pixel 74, as in FIG. 17.

Referring to FIG. 19, the data driver 72 supplies the real data voltages Vdata, which are the positive voltages higher than the reference voltage Vref, to the data lines D1 to Dm for the ½ frame period, and then supplies the black gray level voltages /Vdata, which are the negative voltages lower than the reference voltage Vref, to the data lines D1 to Dm for the second half frame period. The real data voltages Vdata and the black gray level voltages /Vdata supplied to the data lines D1 to Dm are supplied to the gate electrode of the drive TFT nT2 when the switch TFT nT1 is turned on by the scan pulses. The drive TFT nT2 opens the drain-source channel when the real data voltages Vdata are applied, thereby supplying the currents to the organic light emitting diode OLED so that the organic light emitting diode OLED is made to emit light at the brightness corresponding to the gray level of the data. And then, the drive TFT nT2 is turned off when the black gray level voltage /Vdata is applied.

The black gray level voltage /Vdata and the real data voltage Vdata have a voltage difference which is symmetric on the basis of the reference voltage Vref.

The storage capacitor C2 stores the real data voltage Vdata for the first half frame period to fixedly maintain the voltage of the drive TFT nT2.

A case where the switch TFT T1 and the drive TFT T2 are realized as the same type MOS-FET, is shown in FIG. 14 to FIG. 19. However, the switch TFT T1 and the drive TFT T2 may be realized as a different type MOS-FET. In other words, the switch TFT T1 may be realized as a n-type MOS-FET and the drive TFT T2 may be realized as a p-type MOS-FET, or the switch TFT T1 may be realized as a p-type MOS-FET and the drive TFT T2 may be realized as a n-type MOS-FET.

Figure 20:
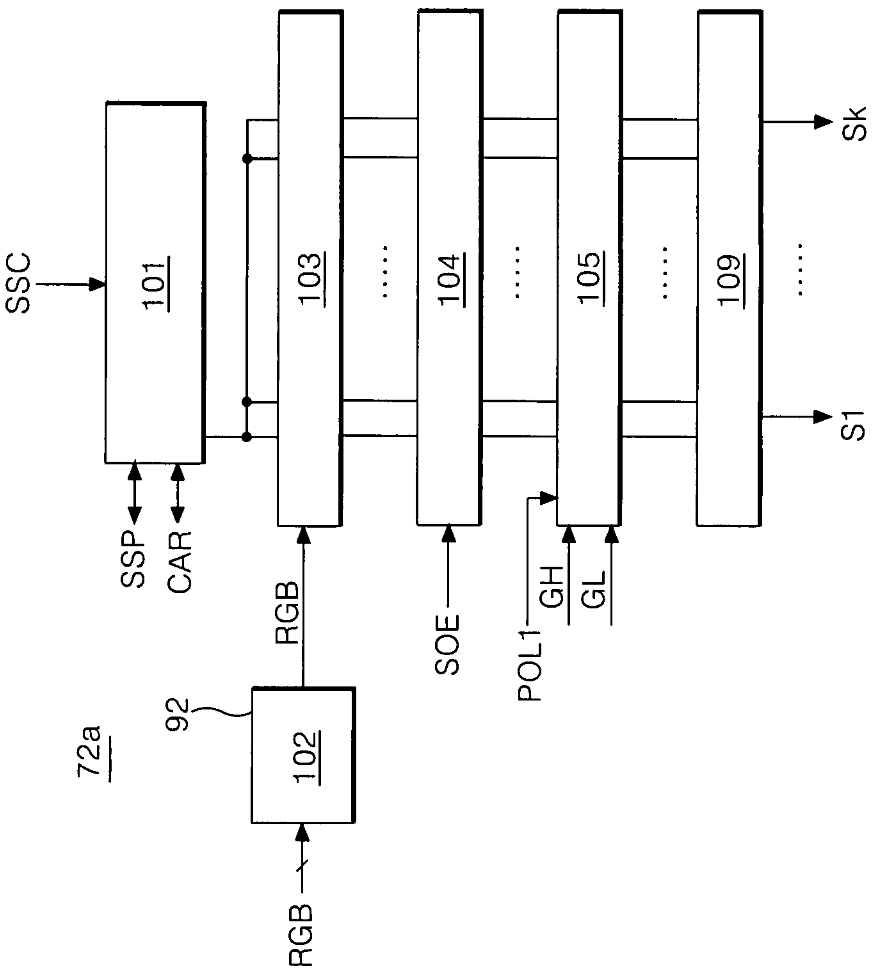
FIG. 20 is a circuit diagram illustrating an integrated circuit of a data driver shown in FIG. 7, in detail.
Figure 22:
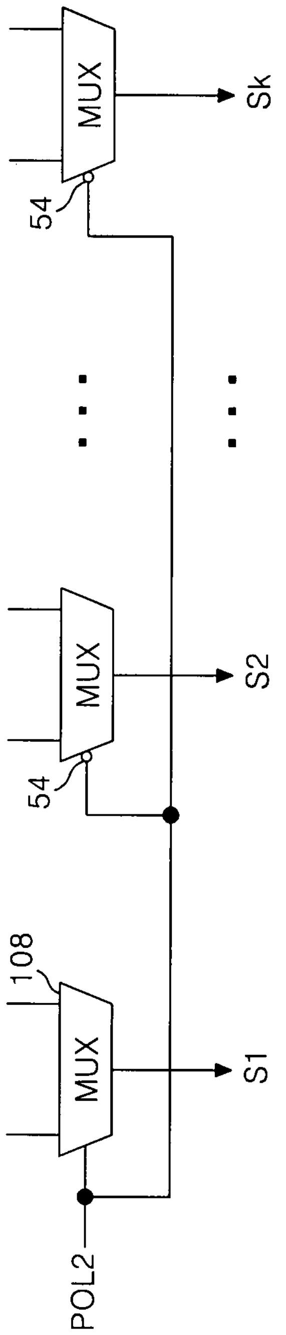
FIG. 22 is a circuit diagram illustrating a multiplexer according to an embodiment of the invention that selects a data voltage and an inversed voltage to output them in accordance with a polarity control signal of which a logical value is inversed by a horizontal period.

FIGS. 20 and 22 are circuit diagrams representing an integrated circuit of the data driver 72, in detail.

Figure 21:
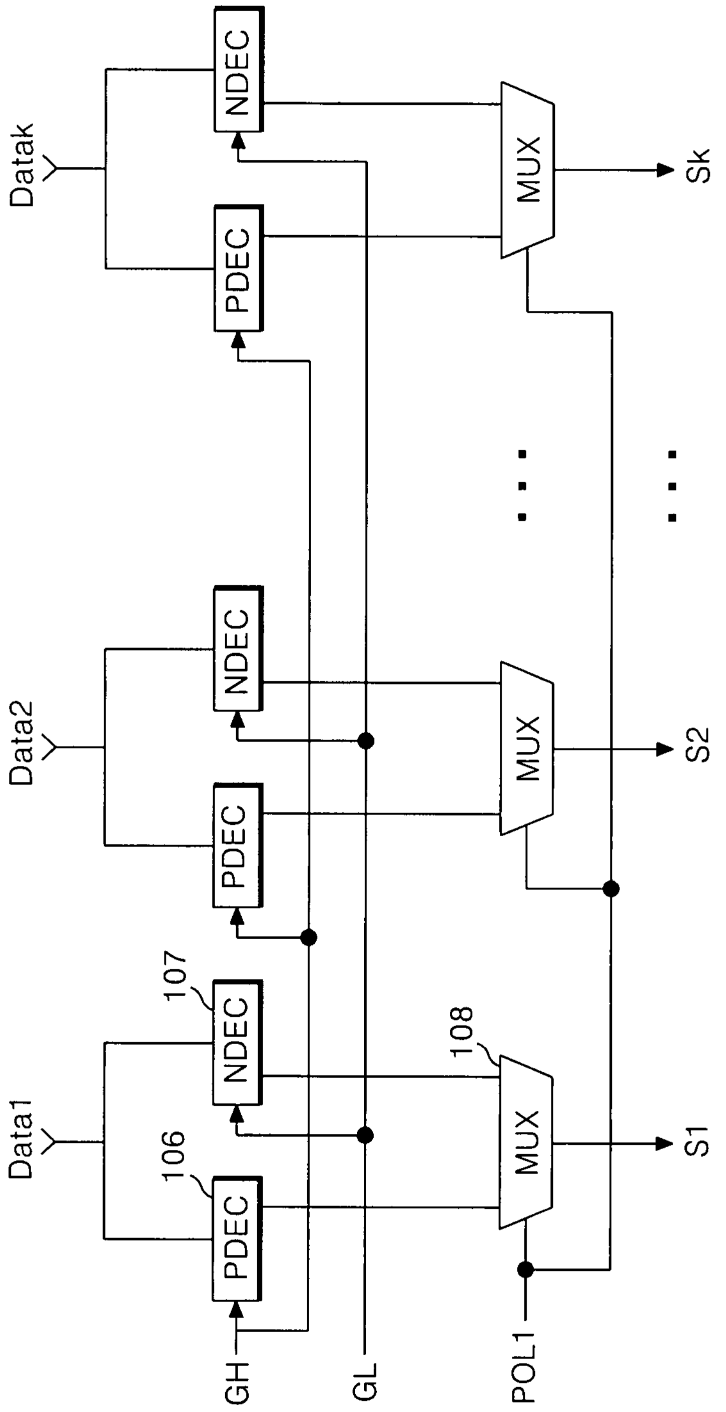
FIG. 21 is a circuit diagram illustrating a digital/analog converter shown in FIG. 20, in detail.

Referring to FIGS. 20 and 21, the data driver 72 includes a plurality of integrated circuits IC which each drive k (k is an integer less than m) number of data lines S1 to Sk. Each of the integrated circuits includes a shift register 101 connected in cascade between the timing controller 71 and the data line S1 to Sk; a data register 102; a first latch 103; a second latch 104; a digital/analog converter (hereinafter, referred to as "DAC") 105; and an output circuit 109.

The shift register 101 shifts source start pulses SSP from the timing controller 71 in accordance with source shift clocks SSC to generate sampling signals. Further, the shift register 101 shifts the source start pulses SSP to transmit carry signals CAR to the shift register 101 of the next stage integrated circuit.

The data register 102 temporarily stores digital video data RGB from the timing controller 71 and supplies the stored data RGB to the first latch 103.

The first latch 103 samples the digital video data RGB from the data register 102 in response to the sampling signals sequentially inputted from the shift register 101, latches the sampled data by the unit of one horizontal line, and then simultaneously outputs the data of one horizontal line.

The second latch 104 latches the data inputted from the first latch 103, and then outputs the digital video data, which are latched at the same time as the second latches 104 of other integrated circuits, in response to source output signals SOE from the timing controller 71.

The DAC 105 includes a p-decoder PDEC 106 to which positive gamma reference voltages GH are supplied; a n-decoder NDEC 107 to which negative gamma reference voltages GL are supplied; and a multip to output the positive gamma compensation voltages corresponding to the gray level values of the data, and the n-decoder 107 decodes the digital video data inputted from the second latch 104 to output the negative gamma compensation voltages corresponding to the gray level values of the data.

The multiplexer 108 of the first and second embodiments alternately selects a gamma compensation voltage of positive polarity and a gamma compensation voltage of negative polarity and outputs selected gamma compensation voltages of positive polarity/negative polarity as analog data voltages in response to a first polarity control signal POLL.

A logical value of the first polarity control signal POL1 is inversed by a ½ frame period unit so as to uniformly supply the black gray level voltage /Vdata or the real data voltage Vdata to all pixels for a ½ frame period.

The multiplexer 108 of the third embodiment alternately selects a gamma compensation voltage of positive polarity and a gamma compensation voltage of negative polarity and outputs selected gamma compensation voltages of positive polarity/negative polarity as analog data voltages in response to a second polarity control signal POL2.

The second polarity control signal POL2 indicates polarities of the real data voltage Vdata and the black gray level voltage /Vdata, which are supplied to each of the pixels, and a logical value thereof is inversed by a horizontal period unit as shown in FIG. 12.

Furthermore, in the third embodiment of the present invention, an inverter 54 is connected to a selective signal input terminal of the even numbered multiplexer 108 as shown in FIG. 22. The inverter 54 plays a role to inverse the second polarity control signal POL2 from the timing controller 74.

Accordingly, in the third embodiment of the present invention, the real data voltage Vdata and the black gray level voltage /Vdata are supplied from the data driver 72 to the display panel 70 by a dot inversion method.

The output circuit 109 includes a buffer to minimize the signal attenuation of the analog data voltage supplied to the data line S1 to Sk.

If the TFTs of the pixel 74 are realized in a p-type MOS-FET, as in FIG. 14, the negative gamma compensation voltage outputted from the n-decoder 107 is the real data voltage Vdata, and the positive gamma compensation voltage outputted from the p-decoder 106 is the black gray level voltage /Vdata. But, on the other hand, if the TFTs of the pixel 74 are realized in a n-type MOS-FET, as in FIG. 17, the positive gamma compensation voltage outputted from the p-decoder 106 is the real data voltage Vdata, and the negative gamma compensation voltage outputted from the n-decoder 107 is the black gray level voltage /Vdata.

Figure 23:
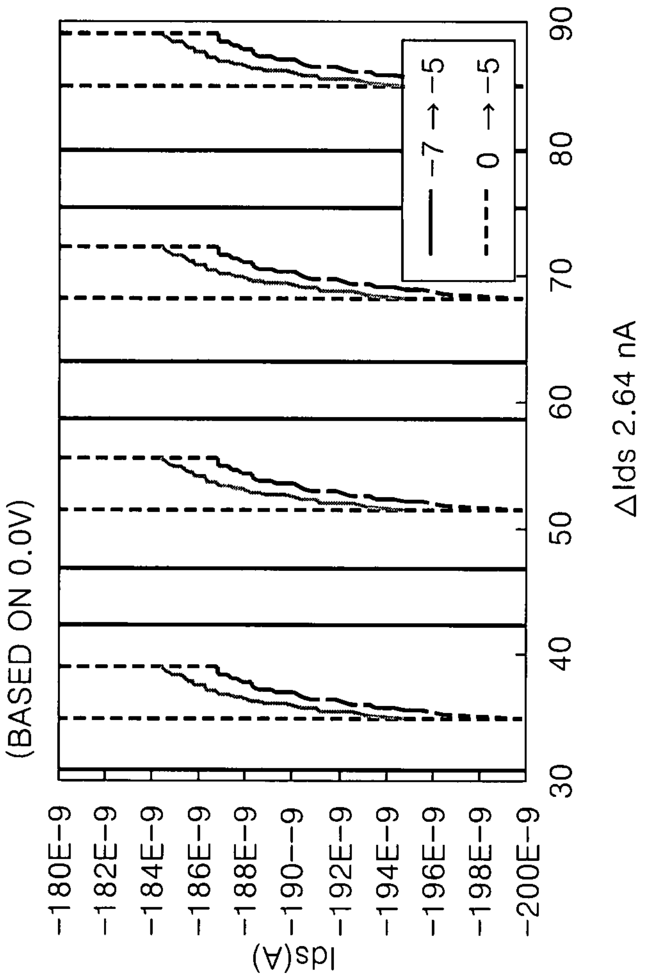
FIGS. 23 to 25 are graphs illustrating experiment results for verifying the effect of the present invention.
Figure 24:
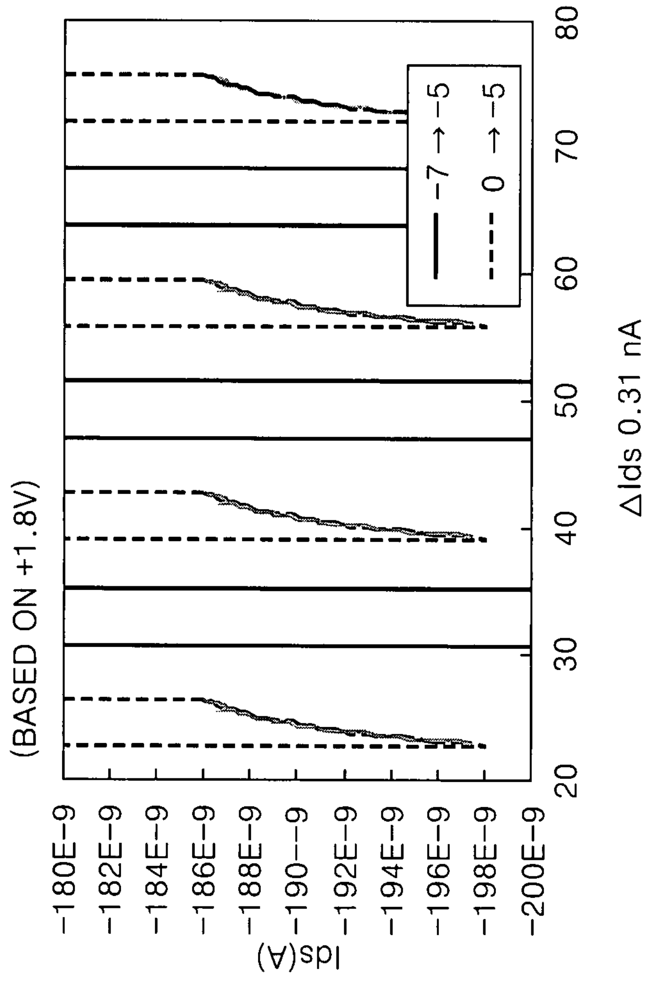
Figure 25:
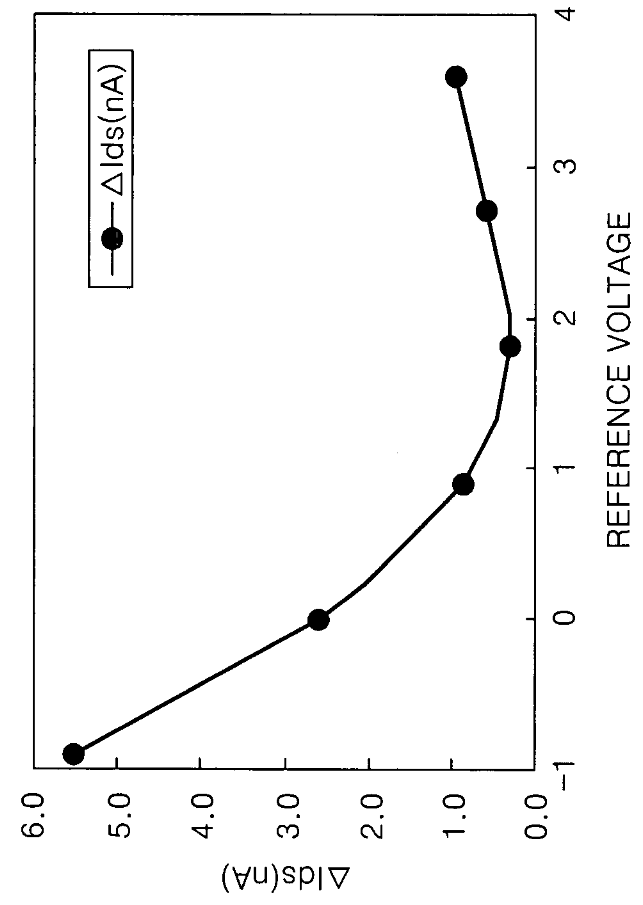

FIGS. 23 to 25 represent experiment results for verifying the effect of the present invention.

Figure 5:
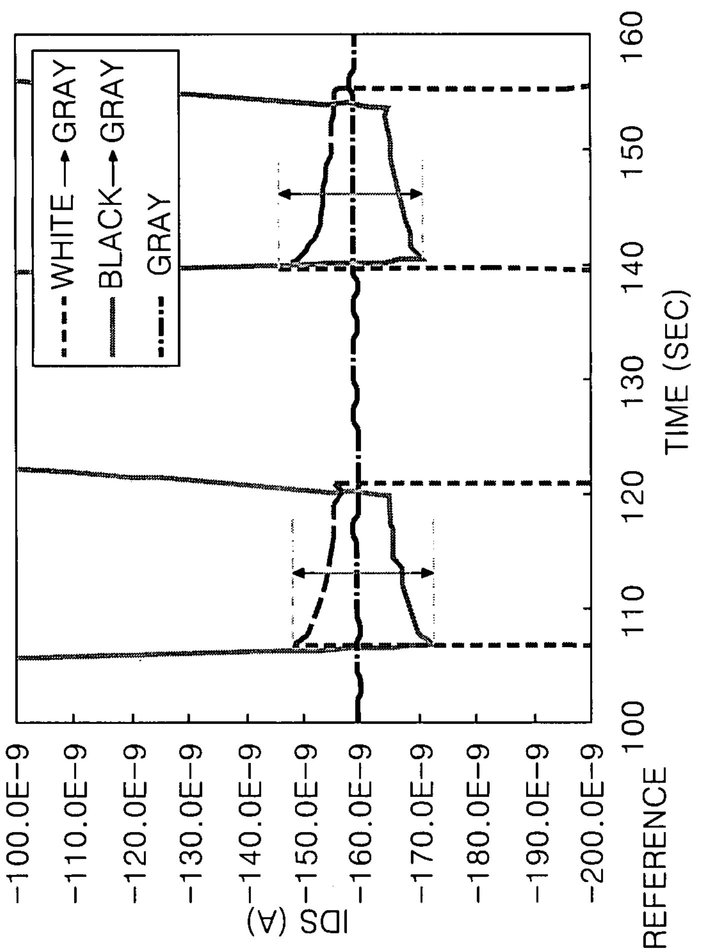
FIG.5 RELATED ART
FIG. 5 is a waveform diagram showing a drain-source current of a drive TFT changed by a gate voltage, as in FIG. 4.
Figure 6:
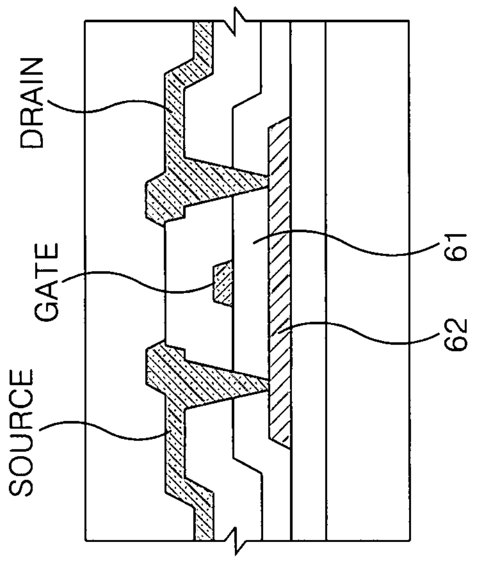
FIG. 6 RELATED ART
FIG. 6 is a cross sectional diagram showing a drive TFT, in detail according to the related art.

FIG. 23 represents the change of the drain-source current of the drive TFT pT2 when the black gray level voltage /Vdata and the real data voltage Vdata, as in FIGS. 15 and 16, are alternately applied to the drive TFT pT2, but the real data voltage Vdata is changed from −7V corresponding to the white gray level to −5V corresponding to the intermediate gray level and from 0V corresponding to the black gray level to −5V corresponding to the intermediate gray level. The reference voltage Vref, i.e., the high level drive voltage VDD, is supplied at 0V in the experiment of FIG. 23. As can be known in FIG. 23, if the black gray level voltage /Vdata and the real data voltage Vdata are alternately applied to the drive TFT pT2, the error of the current Ids of the drive TFT pT2 is reduced to about 2.6 nA when the real data voltage Vdata is changed from the black gray level to the intermediate gray level or from the white gray level to the intermediate gray level. In comparison with this, in the driving method of the related art, the error of the current Ids of the drive TFT pT2 is about 20 nA, as in FIG. 5.

FIG. 24 represents the change of the drain-source current Ids of the drive TFT pT2 when the reference voltage Vref is adjusted to +1.8V and the other experiment conditions are made to be the same as the experiment of FIG. 23. In the experiment of FIG. 24, in the same manner as FIG. 23, the black gray level voltage /Vdata and the real data voltage Vdata are alternately applied to the drive TFT pT2, but the real data voltage Vdata is changed from −7V corresponding to the white gray level to −5V corresponding to the intermediate gray level and from 0V corresponding to the black gray level to −5V corresponding to the intermediate gray level. As can be known in FIGS. 24 and 25, if the black gray level voltage /Vdata and the real data voltage Vdata are alternately applied to the drive TFT pT2 and the reference voltage Vref is adjusted to the positive voltage of not less than 0V, e.g., +1.8V, the error of the current Ids of the drive TFT pT2 is further reduced to about 0.31 nA when the real data voltage Vdata is changed from the black gray level to the intermediate gray level or from the white gray level to the intermediate gray level. Accordingly, the reference voltage Vref, i.e., the high level drive voltage VDD, is desirable to be increased to the positive voltage of not less than 0V. On the other hand, the reference voltage Vref can be optimized to be 1.8V, as in FIG. 25, but the device characteristic of the drive TFT pT2 might be different for each panel and for each model, thus the reference voltage Vref might be changed in accordance with the characteristic of the drive TFT pT2.

In the experiments of FIGS. 23 to 25, a data sampling time is set to be a thousand fold the data sampling time of the original display device, and the inverted black gray level voltage /Vdata and the real data voltage Vdata are alternately applied. As a result thereof, it is confirmed that the insulating layer charge Δ Qinsulator of the drive TFT pT2 is almost 0. Because of lexer 108 for selecting any one of the output of the p-decoder 106 and the output of the n-decoder 107, as in FIG. 21. The p-decoder 106 decodes the digital video data inputted from the second latch 104 this, after the gate voltage is applied, the current is decreased for a few seconds due to the increase of the insulating layer charge Qinsulator, but the inverted black gray level voltage /Vdata is applied to reduce the insulating layer charge Qinsulator of the same amount, thus the current characteristic of the drive TFT becomes the same in the next frame period as in the previous frame period.

As described above, the organic light emitting diode display device according to the present invention decodes the digital video data to the positive voltage and the negative voltage so as to generate the black gray level voltage and the real data voltage which are symmetric on the basis of the reference voltage, and alternately supplies the voltages to the gate electrode of the drive TFT, thereby minimizing the deterioration of the electrical characteristic of the drive TFT and the residual image thereof.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An organic light emitting diode display device comprising:

a display panel where pixels having an organic light emitting diode device is arranged in a matrix;

a data driver that supplies any one of a data voltage and an inverted voltage of the data voltage to any one pixel of two pixels adjacent in a vertical and horizontal directions and supplies another one of the data voltage and the inverted voltage to another pixel of the two pixels for a first half frame period of one frame period, and supplies the another one of the data voltage and the inverted voltage to the another one pixel of the two pixels and supplies the any one of the data voltage and the inverted voltage to the any one pixel of two pixels for a second half frame period of the one frame period, wherein the inverted voltage is symmetric to the data voltage relative to a reference voltage;

a scan driver that sequentially supplies scan signals to scan lines for the first half frame period of the one frame period, and sequentially supplies the scan signals to the scan lines for the second half frame period of the one frame period, wherein a same scan signal is supplied to each of the scan lines twice during the first and second half frame periods of the one frame period;

a drive device that drives the organic light emitting diode device using the data voltage and the inverted voltage;

a high level voltage source that supplies a high level power supply voltage to the drive device;

a low level voltage source that supplies a low level power supply voltage to a cathode electrode of the organic light emitting diode;

a switch device that alternately supplies the data voltage and the inverted voltage from data lines to a gate electrode of the drive device in response to the scan signal from the scan line;

a p-decoder configured to convert digital video data into voltages of a first polarity;

an n-decoder configured to convert the digital video data into voltages of a second polarity;

multiplexers configured to alternately output the voltages of the first polarity and the voltages of the second polarity by a ½ frame period unit of the one frame period in response to a polarity control signal; and an inverter connected to an input terminal of even numbered multiplexer of the multiplexers, wherein the reference voltage comprises a positive voltage larger than 0V.

2. The organic light emitting diode display device according to claim 1, wherein the reference voltage and the high level power supply voltage comprises substantially the same voltage.

3. The organic light emitting diode display device according to claim 1, wherein the drive device and the switch device are comprises n-type transistors.

4. The organic light emitting diode display device according to claim 1, wherein the drive device and the switch device comprise a p-type transistors.

5. The organic light emitting diode display device according to claim 1, wherein the drive device and the switch device comprise transistors having different conductivity.

6. The organic light emitting diode display device according to claim 1, wherein the data voltage and the inverted voltage, which are supplied to the adjacent pixels, are inverted by a ½ frame period unit of the one frame period.

7. The organic light emitting diode display device according to claim 1, wherein the polarity control signal indicates a polarity of the voltage of first polarity and a polarity of the voltage of second polarity, and a logical value thereof is inverted by a horizontal period and a vertical period.

8. The organic light emitting diode display device according to claim 1, further comprising a timing controller configured to supply the digital video data to the data driver and to control an operation timing of the scan driver and the data driver.

9. The organic light emitting diode display device according to claim 8 further comprising: a frame memory that stores and delays digital video data corresponding to a (n+1)th frame during the digital video data corresponding to an nth frame that is supplied to the data driver.

10. The organic light emitting diode display device according to claim 9, wherein the frame memory is mounted in the timing controller.

11. The organic light emitting diode display device according to claim 1, wherein a voltage difference between the reference voltage and the data voltage comprises substantially the same magnitude as a voltage difference between the reference voltage and the inverted voltage.

* * * * *